UNITED STATES PATENT OFFICE.

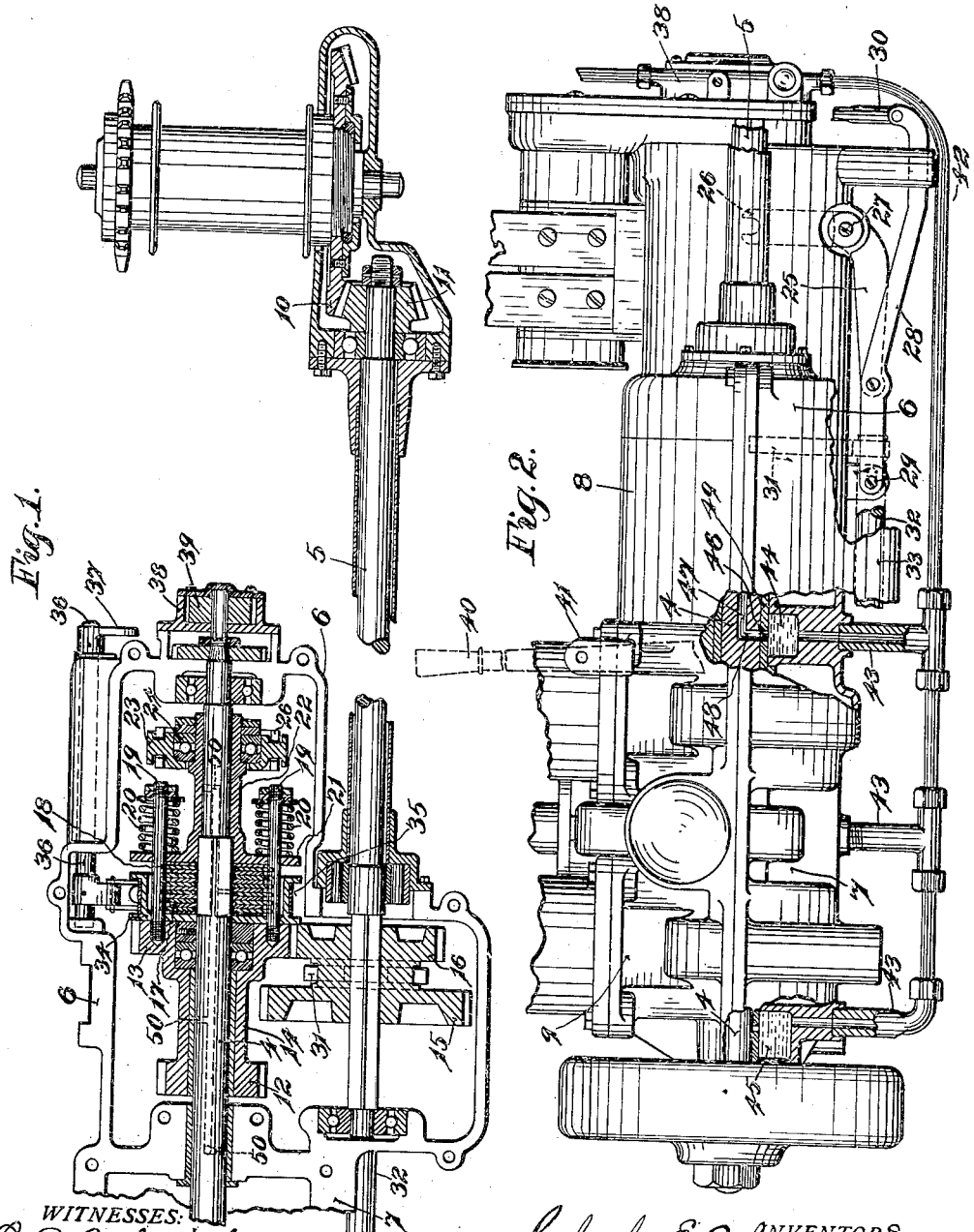

CHARLES E. BAKER AND EVERETT M. DE LONG, OF HARTFORD, CONNECTICUT, ASSIGNORS, BY MESNE ASSIGNMENTS, TO THE NEW BRITAIN MACHINE COMPANY, OF NEW BRITAIN, CONNECTICUT, A CORPORATION OF CONNECTICUT.

TRANSMISSION MECHANISM.

1,126,175.   Specification of Letters Patent.   Patented Jan. 26, 1915.

Application filed July 8, 1910. Serial No. 570,951.

*To all whom it may concern:*

Be it known that we, CHARLES E. BAKER and EVERETT M. DE LONG, citizens of the United States, and residents of Hartford, in the county of Hartford and State of Connecticut, have invented a new and useful Improvement in Transmission Mechanism, of which the following is a specification.

Our invention relates to that class of devices employed for transmitting power between driving and driven mechanism and more especially to such devices when employed in motor vehicle construction, and the objects of our invention are, among others, to provide a device of this class which shall be extremely simple in construction, containing a minimum number of parts, and in which maximum efficiency may be obtained both as to power and as to safety.

One form of construction in the use of which the objects above set out may be attained is illustrated in the accompanying drawings, in which—

Figure 1 is a view in horizontal section through the transmission casing and a portion of the crank casing of a vehicle. Fig. 2 is a side view of the crank and transmission casings, with parts broken away to show construction.

While our invention is not limited in its use to any particular kind of transmission mechanism, yet as it finds ready adaptation in motor vehicle construction and especially in that class of motor vehicles known as motorcycles, such has been selected by us for the purpose of illustration and description of our invention herein.

In the accompanying drawings the numeral 6 denotes the lower portion of a transmission casing and 7 the lower portion of a crank casing, each of these two casing parts being formed of a single piece of metal, thus providing an extremely rigid structure.

The numeral 8 denotes the upper portion of the transmission casing and 9 a portion of the crank casing, these two being formed of a single piece to complete the construction of the casing as a strong, rigid structure.

An engine of any suitable form and construction may be mounted upon the casing and will be connected to drive the crank shaft 4 in any usual manner. As the means for mounting and connecting up the engine will be well understood by those skilled in the art illustration thereof is omitted herein, suffice to say that the crank shaft 4 will contain the usual cranks to which the pitmen are connected.

A driving shaft 5 is mounted in the frame of the vehicle, this shaft being connected with the rear or driving wheel in any suitable manner, as by means of a bevel gear 10 meshing with a pinion 11, the bevel gear being mounted to rotate the driving wheel and the pinion being secured to the shaft 5.

A set of driving gears are loosely mounted upon the shaft 4 and are connected to be driven therewith as by means of a clutch. In the preferred form of construction and as shown herein these gears 12 and 13, two in number, as shown, are mounted upon a sleeve 14, and a pair of gears 15, 16 are mounted for sliding movement upon the shaft 5. These gears 15, 16 may be caused to mesh with the gears 12 and 13, the gear 15 with the gear 12 in one position of the sliding gears, and the gear 16 with the gear 13 in another position. In still another position the gears 15, 16 will mesh with neither of the gears 12 or 13. A preferred form of clutch for connecting the gears 12, 13 with the shaft 4, and as shown herein, is what is known as a disk clutch in which a number of disks 17 are secured to rotate with the shaft 4, and a set composed of the disks 18 are mounted loosely upon the shaft. Pins 19 extend from the gear 13 through notches in the edges of the disks 18 and springs 20 are mounted upon these pins and tend to force a clutch-plate 21 toward the gear. This clutch-plate is secured to a clutch-sleeve 22 loosely mounted upon the shaft 4 and operated by a collar 23 connected with the sleeve as by means of a ball bearing 24 of any ordinary form and construction. A clutch-lever 25 having a fork 26 is connected with the collar as a means for operating it. The clutch-lever 25 is pivoted as at 27 to the case, and a clutch-operating lever 28 pivoted as at 29 to the case extends to receive a connection 30 which is moved endwise to rock the lever 28 on its pivot. Any means for exerting a pull upon the connection 30 may be employed, in the machine of which the mechanism herein forms a part, this connection being operated by a flexible cord attached to a hand-lever on one of the handgrips of the motor-cycle. This connection, however, forming no part of the present invention illustration and further description are omitted.

The gears 15, 16 are operated as by means of a change speed fork 31, the branches of which are located in a groove between the gears as clearly shown in Fig. 1 of the drawings. This fork is secured to a change speed rod 32 mounted to slide in a bearing 33 in the case. This rod may be operated in any convenient manner, as herein shown it being connected to a hand-lever 40 pivotally mounted on a plate 41 on the frame of the machine.

It will be noted from the construction herein illustrated in connection with the foregoing description that the different rates of speed imparted to the shaft 5 are obtained directly by means of intermeshing gears mounted upon the shafts 4 and 5, thus avoiding the use of an intermediate shaft or intermediate gears. The crank shaft 4 thus serves the double function of a crank shaft and of a jack shaft employed in many forms of transmission mechanism.

A brake-drum 34 is secured to the gear 13 and a band-brake 35 is wrapped about this drum and is mounted with one end attached to a stationary part of the machine and the other to a rock-shaft 36. The details of construction and operation of this band-brake are omitted herein as they will be readily understood by those skilled in the art. Briefly stated, the brake is operated by simply rocking the shaft 36 which may be done as by means of a lever 37 connected with any suitable operating means. In the motor-cycle of which the mechanism herein shown forms a part this lever 37 will have a flexible connection with a lever upon one of the handle bars of the vehicle. This forms a brake entirely inclosed within the casing and thoroughly shielded not only from the ill effects of dust and dirt, but also from liability to injury from other causes.

It will further be noted that the mechanism herein illustrated and described embodies the entire driving and transmission mechanism mounted as a unit, that is, parts of the casing in which the driving and transmission mechanism are located are formed of a single piece, thus rigidly mounting the several parts so that there can be no unintentional movement of one part with respect to the other.

The means for lubricating the shafts forms a feature of our invention. A pump 38 is secured to the casing and is driven from the crank shaft 4 so that it is in continual operation when the engine is running. This pump may be of any well-known construction and a detailed description and illustration is therefore omitted herein, suffice to say that the pump mechanism is connected to be driven from the crank shaft 4. A distributing pipe 42 extends from the pump underneath the casing, branches 43 extending to passages leading to oil reservoirs 44, 45. An oil port 46 extends from the reservoir 44 to the bearing of the crank shaft 4 and a duct 47 extends lengthwise of the shaft with an inlet 48 extending laterally from the duct to the port 46, which latter, in the preferred form of construction, extends through a sleeve 49. Outlets 50 open from the duct 47 to the several points where oil is required for lubricating purposes. The pump being thus in continual operation the oil in the reservoirs 44, 45 is under continual pressure when the engine is running. The supply to the duct 47 is replenished at every rotation of the shaft 4, the inlet 48 communicating with the port 46 at each rotation, and the oil in the duct 47 is consequently kept under pressure, insuring a constant and proper supply to the bearings.

We do not limit our invention and the scope of the following claims to the foregoing illustration and description of the preferred form in which it has been embodied, as they may be departed from to a greater or lesser extent without avoiding the invention.

We claim—

1. A power driven shaft, a set of change speed gears mounted thereon, a driving shaft, a set of change speed gears mounted thereon, a casing completely inclosing said gears, means for causing said gears to mesh and unmesh, and a brake secured to operate upon one of said shafts and inclosed within said casing.

2. A casing, a power driven shaft extending within the casing, a set of change speed gears loosely mounted on said shaft, a clutch to secure said gears to the shaft, a brake located within the casing for application to stop the rotation of said gears, a driving shaft projecting within the casing, change speed gears mounted on the driving shaft, and means for meshing and unmeshing said gears to impart variable movement to the driving shaft.

3. A power driven shaft, a set of change speed gears loosely mounted on the shaft, a clutch to secure the gears to rotate with the shaft, a drum surrounding the clutch, a band brake arranged to grasp the drum, means for operating the brake, a driving shaft, a pair of change speed gears mounted on the driving shaft, and means for moving said gears longitudinally of the driving shaft to mesh and unmesh with the gears on the power driven shaft.

4. A power driven shaft, a set of change speed gears loosely mounted on the shaft, a clutch for connecting said gears to the shaft, a drum surrounding the clutch, a sleeve mounted to rotate with the shaft, a plate resting against a member of the clutch, springs pressing against said plate to hold the clutch members engaged, means for moving the sleeve lengthwise of the shaft to disengage the clutch members, a driving shaft, a set of change speed gears mounted on the driving shaft, and means for causing said gears to mesh and unmesh to impart variable movement to the driving shaft.

5. A casing, a shaft extending within the casing, a clutch mounted to control the operation of said shaft and including a drum forming a clutch member and within which another clutch member is inclosed, a band brake arranged to grasp the drum, and means located outside of the casing and connected with the band brake for operating it.

CHARLES E. BAKER.
EVERETT M. DE LONG.

Witnesses:
G. B. LYNCH,
LENA E. BERKOVITCH.

Copies of this patent may be obtained for five cents each, by addressing the "Commissioner of Patents, Washington, D. C."